(12) United States Patent
Jarman et al.

(10) Patent No.: US 12,515,997 B2
(45) Date of Patent: Jan. 6, 2026

(54) INFILTRATING BORON NITRIDE INTO A CARBON-CARBON SUBSTRATE

(71) Applicant: GOODRICH CORPORATION, Charlotte, NC (US)

(72) Inventors: Jecee Jarman, Pueblo, CO (US); Lauren Bartolo, Pueblo, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 186 days.

(21) Appl. No.: 18/467,059

(22) Filed: Sep. 14, 2023

(65) Prior Publication Data
US 2025/0091961 A1    Mar. 20, 2025

(51) Int. Cl.
C04B 35/83      (2006.01)
C04B 35/626     (2006.01)
(Continued)

(52) U.S. Cl.
CPC .......... *C04B 35/83* (2013.01); *C04B 35/6269* (2013.01); *C04B 35/62868* (2013.01); *C04B 35/62873* (2013.01); *C04B 35/62886* (2013.01); *C04B 35/62894* (2013.01); *C04B 35/64* (2013.01); *C04B 2235/386* (2013.01); *C04B 2235/422* (2013.01); *C04B 2235/486* (2013.01); *C04B 2235/5248* (2013.01); *C04B 2235/5256* (2013.01); *C04B 2235/616* (2013.01); *C04B 2235/6567* (2013.01)

(58) Field of Classification Search
CPC ................... C04B 2235/6586; C04B 2235/65
See application file for complete search history.

(56) References Cited

U.S. PATENT DOCUMENTS 5,079,195 A    1/1992  Chiang et al.
5,399,377 A    3/1995  Economy et al.
(Continued)

FOREIGN PATENT DOCUMENTS

CN    101875562    5/2012
CN    110436951    11/2019
(Continued)

OTHER PUBLICATIONS

Ning et al. (Ceramics International 48 (2022) 525-539) (Year: 2022).*

(Continued)

*Primary Examiner* — Kelly M Gambetta
(74) *Attorney, Agent, or Firm* — SNELL & WILMER L.L.P.

(57) ABSTRACT

A method is provided for forming a carbon/carbon (C/C) disk with boron nitride (BN) doping. Borazine is generated using a set of borazine precursors. Starting carbon fibers are coated or impregnated with the borazine in an inert atmosphere. The starting carbon fibers are needled into layered fabric and the layered fabric is needled into boards from which a preform is cut, the needling and cutting performed in the inert atmosphere. The borazine in the preform is stabilized to convert the borazine to polyborazylene. The polyborazylene in the preform is cured. The polyborazylene in the preform is then crystalized to form BN particulates. The preform with the BN particulates is carbonized and then densified with pyrolytic carbon.

20 Claims, 9 Drawing Sheets

(51) Int. Cl.
  *C04B 35/628* (2006.01)
  *C04B 35/64* (2006.01)

(56) References Cited

U.S. PATENT DOCUMENTS

| | | | |
|---|---|---|---|
| 5,612,013 A * | 3/1997 | Sneddon | C01B 35/146 |
| | | | 423/285 |
| 8,529,995 B2 | 9/2013 | Eberling-Fux et al. | |
| 9,046,138 B2 | 6/2015 | Kienzle et al. | |
| 10,035,305 B2 | 7/2018 | La Forest et al. | |
| 2005/0106373 A1 * | 5/2005 | Economy | C04B 35/6268 |
| | | | 428/292.1 |
| 2019/0092698 A1 | 3/2019 | Kirkpatrick et al. | |
| 2023/0219859 A1 | 7/2023 | Nable et al. | |

FOREIGN PATENT DOCUMENTS

| | | |
|---|---|---|
| CN | 113149685 | 7/2021 |
| WO | 2017107735 | 6/2017 |

OTHER PUBLICATIONS

European Patent Office, European Search Report dated Feb. 14, 2025 in Application No. 24200420.8.

* cited by examiner

INFILTRATING BORON NITRIDE INTO A CARBON-CARBON SUBSTRATE

FIELD

The present disclosure relates generally to composites and, more specifically, to depositing boron nitride into a carbon-carbon substrate for manufacturing carbon-carbon (C/C) composites or carbonized preforms for aircraft brake assemblies.

BACKGROUND

Aircraft typically utilize brake systems on wheels to slow or stop the aircraft during landings, taxiing, and rejected takeoffs. The brake systems generally employ a brake stack or heat sink comprising a series of friction disks that may be forced into sliding contact with one another during brake actuation to slow or stop the aircraft. The brake stack typically comprises rotor disks and stator disks that, in response to axial compressive loads, convert the kinetic energy of the aircraft into heat through frictional forces experienced between the friction disks.

SUMMARY

A method for forming a carbon/carbon (C/C) disk with boron nitride (BN) doping is disclosed. The method includes generating borazine using a set of borazine precursors; coating or impregnating starting carbon fibers with the borazine in an inert atmosphere, where an amount of borazine used to coat or infiltrate the starting carbon fiber is between 0.05 percent to 25 percent of a total weight of the starting carbon fiber; needling the starting carbon fiber into layered fabric and then needling the layered fabric into boards from which a preform is cut, the needling and cutting performed in the inert atmosphere; stabilizing the borazine in the preform to convert the borazine to polyborazylene; curing the polyborazylene in the preform; crystallizing the polyborazylene in the preform to form BN particulates; carbonizing the preform with the BN particulates; and densifying the BN particulates in the preform with pyrolytic carbon.

In various embodiments, the coating or impregnating is performed via spraying or dunking in a bath. In various embodiments, the borazine is formed by the method including mixing the set of borazine precursors with a high-temperature solvent thereby forming a mixture; heating the mixture to a first temperature; capturing off gases emitted by the mixing and heating; and condensing the off gases to liquify the borazine. In various embodiments, the set of borazine precursors comprise ammonium sulfate (($NH_4)_2$ $SO_4$), sodium borohydride ($NaBH_4$), and the high-temperature solvent is tetraethylene glycol dimethyl ether, i.e. tetraglyme. In various embodiments, the first temperature is between 135° C. (275° F.) and 150° C. (302° F.).

In various embodiments, the stabilizing is performed at a second temperature for a second predetermined time period to convert the borazine into the polyborazylene. In various embodiments, the second temperature is between 40° C. (104° F.) to 60° C. (140° F.). In various embodiments, the second predetermined time period is between 170 hours and 210 hours. In various embodiments, the curing is performed at a third temperature for a third predetermined time period. In various embodiments, the third temperature is between 180° C. (356° F.) to 220° C. (428° F.). In various embodiments, the third predetermined time period is between 2 hours and 3 hours. In various embodiments, the crystalizing is performed at a fourth temperature for a fourth predetermined time period. In various embodiments, the fourth temperature is between 1200° C. (2192° F.) to 2000° C. (3632° F.). In various embodiments, the fourth predetermined time period is between 2 hours and 5 hours.

Also disclosed herein is a method for forming a carbon/carbon (C/C) disk with boron nitride (BN) doping. The method includes generating borazine using a set of borazine precursors; coating or impregnating a carbonized carbon preform with the borazine in an inert atmosphere, where an amount of borazine used to coat or infiltrate the carbonized carbon preform is between 0.05 percent to 25 percent of a total weight of the carbonized carbon preform; stabilizing the borazine in the carbonized carbon preform to convert the borazine to polyborazylene; curing the polyborazylene in the carbonized carbon preform; crystallizing the polyborazylene in the carbonized carbon preform to form BN particulates; and densifying the BN particulates in the carbonized carbon preform with pyrolytic carbon.

In various embodiments, the coating or impregnating is performed via spraying or dunking in a bath. In various embodiments, the borazine is formed by the method including mixing the set of borazine precursors with a high-temperature solvent thereby forming a mixture; heating the mixture to a first temperature; capturing off gases emitted by the mixing and heating; and condensing the off gases to liquify the borazine. In various embodiments, the set of borazine precursors comprise ammonium sulfate (($NH_4$) $_2SO_4$), sodium borohydride ($NaBH_4$), and the high-temperature solvent is tetraethylene glycol dimethyl ether, i.e. tetraglyme. In various embodiments, the first temperature is between 135° C. (275° F.) and 150° C. (302° F.).

In various embodiments, the stabilizing is performed at a second temperature for a second predetermined time period to convert the borazine into the polyborazylene. In various embodiments, the second temperature is between 40° C. (104° F.) to 60° C. (140° F.). In various embodiments, the second predetermined time period is between 170 hours and 210 hours. In various embodiments, the curing is performed at a third temperature for a third predetermined time period. In various embodiments, the third temperature is between 180° C. (356° F.) to 220° C. (428° F.). In various embodiments, the third predetermined time period is between 2 hours and 3 hours. In various embodiments, the crystalizing is performed at a fourth temperature for a fourth predetermined time period. In various embodiments, the fourth temperature is between 1200° C. (2192° F.) to 2000° C. (3632° F.). In various embodiments, the fourth predetermined time period is between 2 hours and 5 hours. In various embodiments, the carbonized carbon preform is formed by needling uncoated carbon fiber into layered fabric and then needling the layered fabric into boards from which a preform is cut, the needling and cutting performed without BN doping; and carbonizing the preform made of uncoated carbon fibers to form a carbonized carbon preform Additionally disclosed herein is a method for forming a carbon/carbon (C/C) disk with boron nitride (BN) doping. The method includes needling uncoated starting carbon fiber into layered fabric and then needling the layered fabric into boards from which a preform is cut, the needling and cutting performed without BN doping; carbonizing the preform made of uncoated carbon fibers to form a carbonized carbon preform; densifying the carbonized carbon preform with pyrolytic carbon thereby create a densified C/C disk; generating borazine using a set of borazine precursors; coating or impregnating the densified C/C disk with the borazine in an inert atmosphere, wherein an amount of borazine used to coat or infiltrate the densified C/C disk is between 0.05 percent to 25 percent of a total weight of the densified C/C disk; stabilizing the borazine in the densified C/C disk to convert the borazine to polyborazylene; curing the polyborazylene in densified C/C disk; and crystalizing the polyborazylene in the densified C/C disk to form BN particulates.

In various embodiments, the coating or impregnating is performed via spraying or dunking in a bath. In various embodiments, the borazine is formed by the method including mixing the set of borazine precursors with a high-temperature solvent thereby forming a mixture; heating the mixture to a first temperature; capturing off gases emitted by the mixing and heating; and condensing the off gases to liquify the borazine. In various embodiments, the set of borazine precursors comprise ammonium sulfate (($NH_4$)$_2$$SO_4$), sodium borohydride ($NaBH_4$), and the high-temperature solvent is tetraethylene glycol dimethyl ether, i.e. tetraglyme. In various embodiments, the first temperature is between 135° C. (275° F.) and 150° C. (302° F.).

In various embodiments, the stabilizing is performed at a second temperature for a second predetermined time period to convert the borazine into the polyborazylene. In various embodiments, the second temperature is between 40° C. (104° F.) to 60° C. (140° F.). In various embodiments, the second predetermined time period is between 170 hours and 210 hours. In various embodiments, the curing is performed at a third temperature for a third predetermined time period. In various embodiments, the third temperature is between 180° C. (356° F.) to 220° C. (428° F.). In various embodiments, the third predetermined time period is between 2 hours and 3 hours. In various embodiments, the crystalizing is performed at a fourth temperature for a fourth predetermined time period. In various embodiments, the fourth temperature is between 1200° C. (2192° F.) to 2000° C. (3632° F.). In various embodiments, the fourth predetermined time period is between 2 hours and 5 hours.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Provided herein, according to various embodiments, are manufacturing system(s) and method(s) for depositing boron nitride (BN) into carbon brakes at either a textile stage, constructed preform stage, or densified carbon/carbon (C/C) disk stage via a BN polymer precursor which is formulated, cured, and crystallized into BN particulates within the carbon brake during processing. In various embodiments, the BN polymer precursor may be formulated, processed, and infiltrated onto and/or into carbon fibers, carbonized carbon preforms, or densified C/C disks in inert atmospheres before and/or after the BN polymer has been stabilized via curing. In various embodiments, after application and curing of the BN polymer in inert atmospheres, the carbon fibers, carbonized carbon preforms, or densified C/C disks include BN particulates with increased thermal benefits and/or wear rate. Despite the stage of processing at which the BN polymer precursor is added to the carbon brake, the BN polymer precursor may be formulated in inert atmospheres according to a specified process using inorganic salt chemical precursors. After formulation, the BN polymer precursor may be stabilized as a polymer and later cured with a heat treatment all while in inert atmospheres. Afterwards, the cured BN polymer may be heated to crystallize the BN into BN particulates which reside in or on the carbon brake. Detailed descriptions of the BN particulate process are discussed hereafter to identify how the chemical process is involved in the overall densification process of the carbon brake.

Figure 1A:
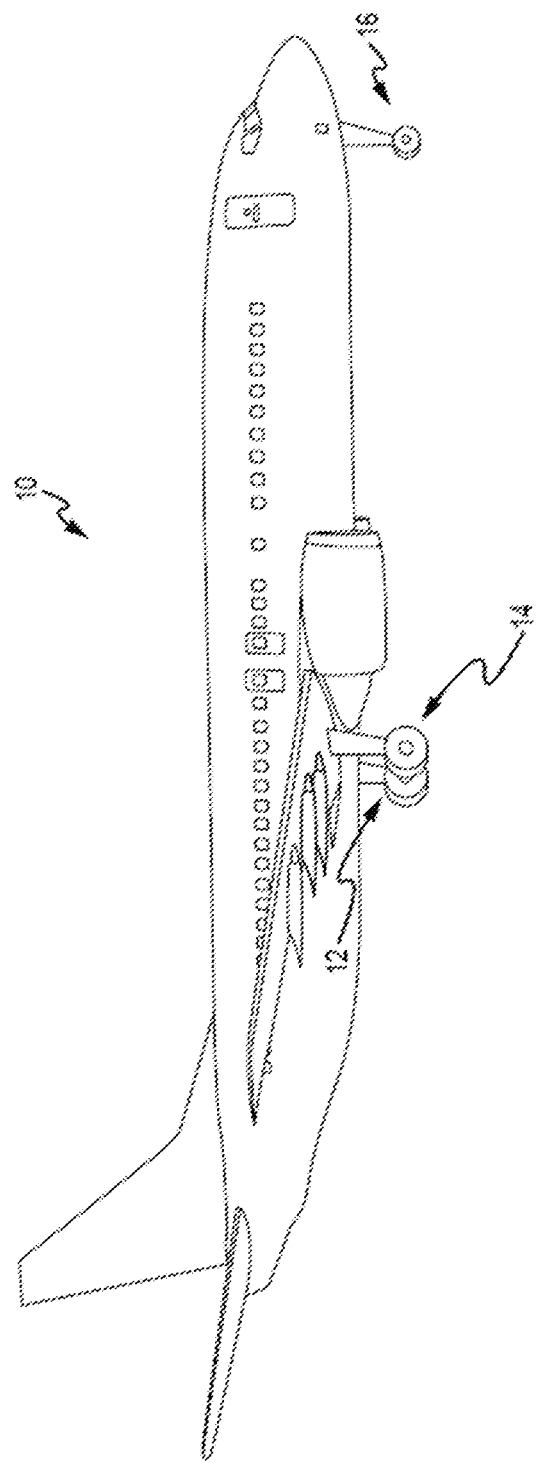
FIG. 1A illustrates an exemplary aircraft having a brake system, in accordance with various embodiments.

Referring now to FIG. 1A, in accordance with various embodiments, an aircraft 10 is illustrated. The aircraft 10 includes landing gear, which may include a left main landing gear 12, a right main landing gear 14, and a nose landing gear 16. The landing gear support the aircraft 10 when it is not flying, allowing the aircraft 10 to taxi, take off, and land without damage. While the disclosure refers to the three landing gear configurations just described, the disclosure nevertheless contemplates any number of landing gear configurations.

Figure 1B:
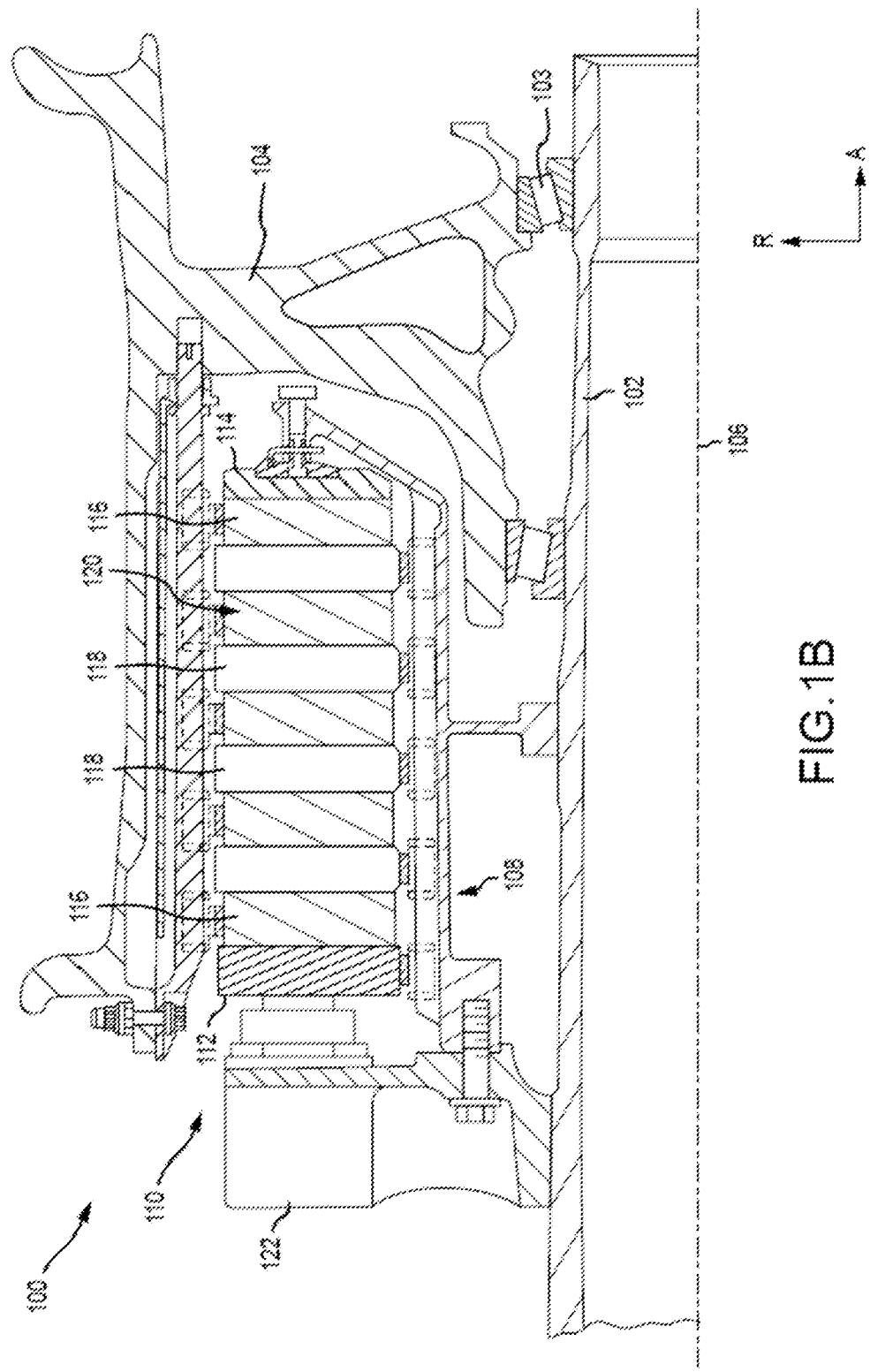
FIG. 1B illustrates a cross-sectional view of a brake assembly, in accordance with various embodiments.

Referring now to FIG. 1B, in accordance with various embodiments, a schematic depiction of a brake mechanism 100 is illustrated. The brake mechanism 100 is configured for use on a landing gear, such as, for example, each of the left main landing gear 12 and the right main landing gear 14 described above with reference to FIG. 1A. In various embodiments, the brake mechanism 100 is mounted on an axle 102 for use with a wheel 104 disposed on and configured to rotate about the axle 102 via one or more bearing assemblies 103. A central axis 106 extends through the axle 102 and defines a center of rotation of the wheel 104. As used herein, the term "radial (R)" refers to directions perpendicular to a central axis 106 of fibrous preform, the term "axial (A)" refers to direction parallel to central axis 106, and the term "circumferential" reference to directions about central axis 106. A torque plate barrel 108 (sometimes referred to as a torque tube or a torque plate) is aligned concentrically with the central axis 106, and the wheel 104 is rotatable relative to the torque plate barrel 108.

The brake mechanism 100 includes a piston assembly 110, a pressure plate 112 disposed adjacent the piston assembly 110, an end plate 114 positioned a distal location from the piston assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118, and the end plate 114 together form a brake heat sink or brake stack 120. The pressure plate 112, the end plate 114, and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114, and the plurality of stator disks 118.

An actuating mechanism for the brake mechanism 100 includes a plurality of piston assemblies, including the piston assembly 110, circumferentially spaced around a piston housing 122 (only one piston assembly is illustrated in FIG. 1B). Upon actuation, the plurality of piston assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the brake disks of brake mechanism 100 (e.g., rotor disks 116 and the stator disks 118) are fabricated from various composite materials, such as, for example, carbon/carbon (C/C) composite or ceramic matrix composite (CMCs), that enable the brake disks to withstand and dissipate the heat generated during and following a braking action.

In accordance with various embodiments, rotor disks 116 and/or stator disks 118 are each comprised of a carbon-carbon (C/C) material having a high specific heat particulate or powder interspersed throughout the rotor disks 116 and/or stator disks 118, where high specific heat particulate includes a particulate or powder that raises the specific heat of the disk above that of C/C composite alone. For example, in various embodiments, the rotor disks 116 and/or stator disks 118 may comprise a C/C composite that includes a percentage of boron nitride (BN) particulates having a high specific heat (i.e., a specific heat greater than the specific heat of the C/C composite alone).

In various embodiments, the process of interspersing boron nitride (BN) polymer precursor onto and/or into the C/C composite may be performed by a coating or infiltration process through either spraying, infiltration, or the like. As described in further detail below, in various embodiments, the BN particulates are derived from a BN polymer precursor material which may infiltrate carbon fibers utilized to form a fiber preform, the constructed fiber preform itself employed to form the C/C composite in the radial, or in-plane, direction, or a densified C/C composite disk. With regard to a constructed fiber preform, in various embodiments, the BN polymer precursor may infiltrate via through thickness infiltration of the fibrous preforms. In various embodiments, infiltrating in the radial, as opposed to the axial, direction may allow greater volumes of polymer precursor to be infiltrated. Increasing the volume of infiltrated polymer precursor may facilitate the densification process by increasing the surface area available for which the matrix material to bond and by decreasing the open, or empty, volume within the preform. In-plane infiltration may also allow thicker fibrous preforms (e.g., fibrous preforms including a greater number of fiber layers as measured in the z-direction, with momentary reference to FIG. 2) to be used in the manufacture rotor disks 116 and/or stator disks 118, as the compared to axial infiltration.

Figure 2:
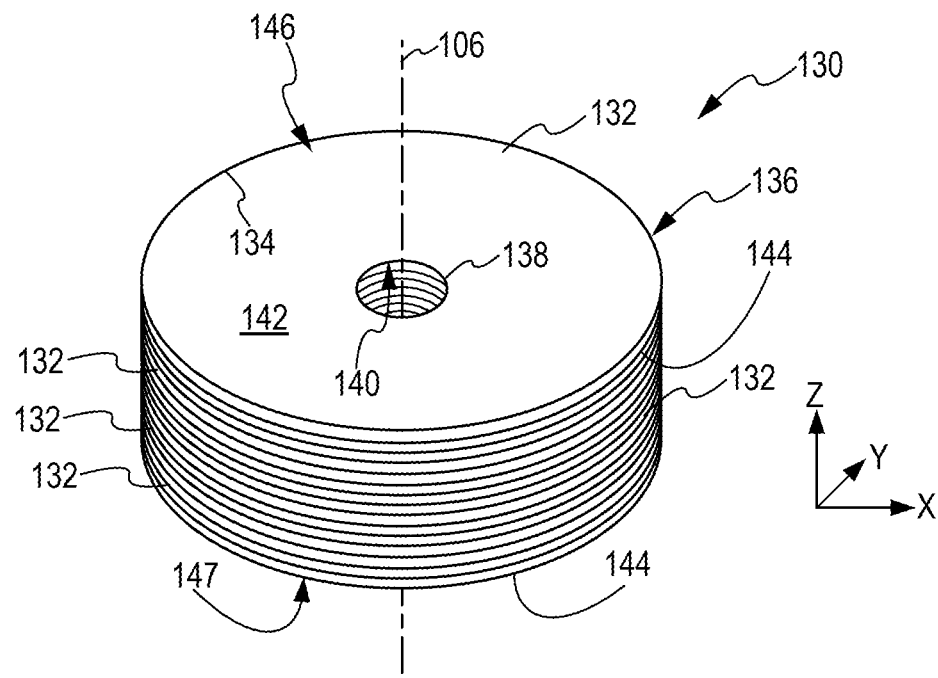
FIG. 2 illustrates a fibrous preform utilized to manufacture a carbon/carbon (C/C) disk, in accordance with various embodiments.

Referring now to FIG. 2, a fibrous preform 130 is illustrated, in accordance with various embodiments. Fibrous preform 130 may be employed to form a rotor disk 116 or a stator disk 118, as described above. Fibrous preform 130 may comprise a porous structure comprised of a plurality of stacked textile layers 132. Each textile layer 132 having a thickness in a first dimension (i.e., the Z-direction) that may be substantially less than a thickness of the textile layer 132 in the other two dimensions (i.e., the X-direction and the Y-direction). As used herein, the "in-plane" direction refers to directions parallel to the thicker two dimensions (i.e., parallel to the X and Y directions and perpendicular to the Z-direction).

Figure 8:
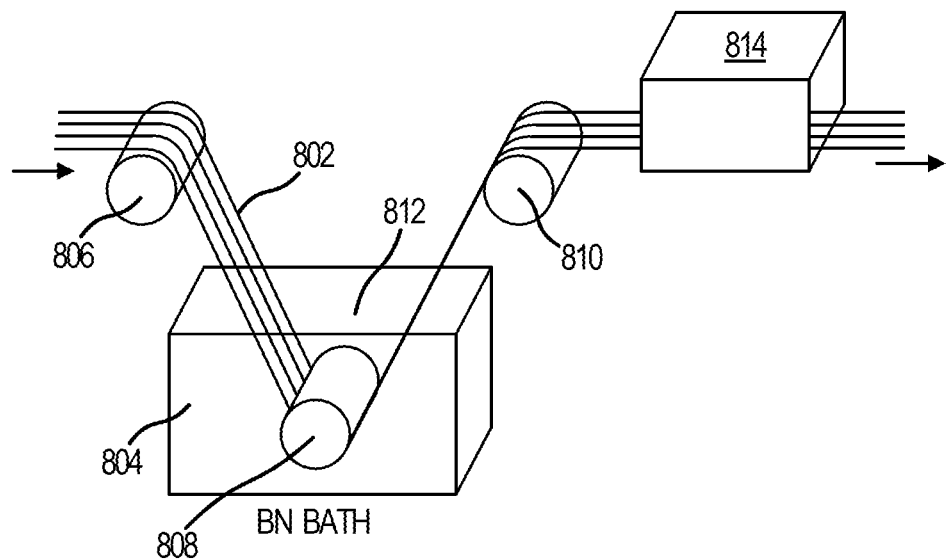
FIGS. 8, 9, 10, and 11 illustrate boron nitride (BN) particulate application process, in accordance with various embodiments.
Figure 9:
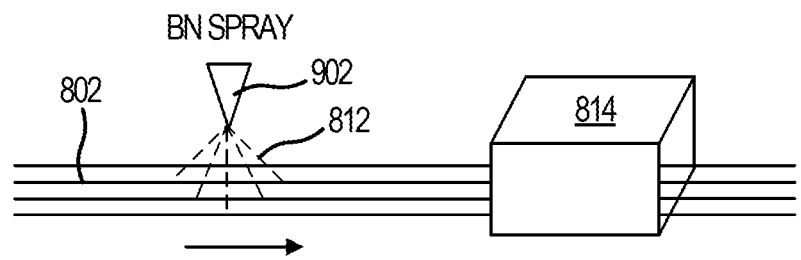

A porous structure may comprise any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 130 may be prepared by needling each textile layer 132 of fibrous preform 130. Needling each textile layer 132 of fibrous preform 130 tends to push fibers from one textile layer 132 to the next textile layer 132 in the z direction, thereby forming z-fibers that extend axially across the textile layers 132. Needling pulls fibers from the in-plane direction and forces them into the z-fiber direction. After needling, fibrous preform 130 may comprise fibers extending in three different directions: the radial direction, the circumferential direction, and the axial direction (or the X, Y, and Z directions shown in FIG. 2). It should be noted that in various embodiments, prior to fibrous preform construction, starting fibers may be coated or impregnated with BN precursor via spraying or infiltration as illustrated in FIGS. 8 and 9. Coating or impregnating the starting fiber prior to fibrous preform construction is one route to place the BN precursor into the product and cure the BN precursor prior to carbonization. The curing process is detailed hereafter, but is typically completed prior to the carbonization step. In various embodiments, the BN precursor impregnation process includes generation of the BN precursor and immersing the carbon fibers, prior to forming the fibrous preform 130, into the BN precursor in an inert atmosphere for a period of time sufficient for the BN precursor to infiltrate the starting fibers. In various embodiments, the BN precursor coating process includes generation of the BN precursor and spraying the BN precursor in an inert atmosphere onto the carbon fibers prior to forming the fibrous preform 130 so that the BN precursors effectively coat the surface of the starting fibers.

Coated or uncoated fibrous preforms 130 may be fabricated using a net shape preforming technology or may be cut from a needled board. Fibrous preform 130 may be a lay-up of coated or uncoated woven, braided or knitted textile layers 132. The fibrous material may be in the form of chopped carbon fibers molded to form the textile layers 132. Prior to the densification process, the fibrous material may be formed into a preform having any desired shape or form. For example, the fibrous preform may be in the form of a disk having any shape such as, for example, a polygon, a cylinder, a triangle, annular, square, rectangle, pentagon, hexagon, octagon, or the like. In various embodiments, the textile layers 132 and fibrous preform 130 may have a generally annular shape. In accordance with various embodiments, the outer circumferential (or outer perimeter) surfaces 134 of the textile layers 132 may form an outer diameter (OD) 136 of fibrous preform 130, and the inner circumferential (or inner perimeter) surfaces 138 of the textile layers 132 may form an inner diameter (ID) 140 of fibrous preform 130. Each textile layer 132 includes a first axial face 142 and a second axial face 144 opposite the first axial face 142. First and second axial faces 142, 144 extend from outer circumferential surface 134 to inner circumferential surface 138. The textile layers 132 are stacked such that the first axial face 142 of one textile layer 132 is oriented toward the second axial face 144 of the adjacent textile layer 132. First axial face 142 of the uppermost textile layer 132 forms the upper axial end 146 of fibrous preform 130 and the second axial face 144 of the bottommost textile layer 132 forms the lower axial end 147 of fibrous preform 130 (i.e., the two textile layers 132 that are farther apart from one another in the axial direction form the axial ends 146, 147 of the fibrous preform).

Figure 3:
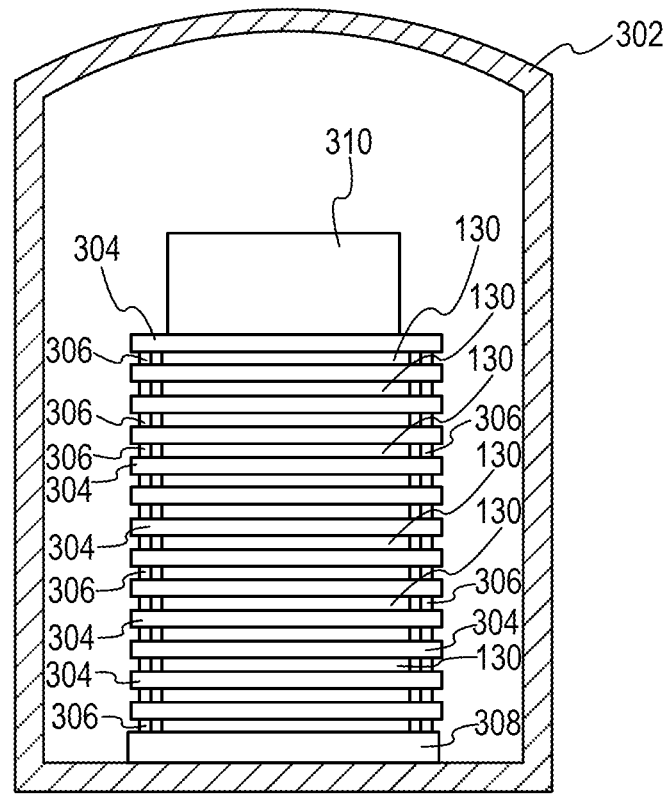
FIG. 3 illustrates a fibrous preform utilized to manufacture a carbon/carbon (C/C) disk in a carbonization furnace, in accordance with various embodiments.

As shown in FIG. 3, in accordance with various embodiments, fibrous preform 130 utilized to manufacture a carbon/carbon (C/C) disk being placed in a carbonization furnace 302 for carbonization is illustrated. The carbonization process may be employed to convert the fibers of the fibrous preform 130 into pure carbon fibers, as used herein only "pure carbon fibers" means carbon fibers comprised of at least 99% carbon. The carbonization process is distinguished from the densification process described below in that the densification process involves infiltrating the pores of the fibrous preform 130 and the carbonization process refers to the process of converting the fibers of the fibrous preform 130 into pure carbon fibers. In various embodiments, the carbonization process may also be used to simultaneously crystalize the cured BN coated starting fibers within the fibrous preforms to produce BN particulates or powder within and around the carbon fibers of the fibrous preform if the precursor was coated onto starting fibers and cured prior to carbonization via the curing process described hereafter.

In various embodiments, a plurality of coated or uncoated fibrous preforms 130 may be placed on top of one another with separator plates 304 and spacing stops 306 disposed between adjacent one of the fibrous preforms 130. For example, the bottommost fibrous preform 130 may be placed on a base plate 308 at the bottom of carbonization furnace 302. A separator plate 304 may be placed on top of the bottommost fibrous preform 130. Another fibrous preform 130 may then be placed on the separator plate 304, and another separator plate 304 may be placed on that fibrous preform 130. A stack of fibrous preforms 130 and separator plates 304 may be constructed in this manner, with each fibrous preform 130 being separated from superjacent and subjacent fibrous preforms 130 by separator plates 304. Stops 306 may be placed between each of the separator plates 304. The stops 306 may comprise a height that is less than the thickness of the fibrous preform 130 prior to carbonization. Stops 306 may define a target thickness of the fibrous preform 130 after carbonization. In that regard, after the stack of fibrous preforms 130 is constructed, and before the carbonization process has started, gaps may exist between the stops 306 and adjacent separator plates 304. During carbonization, a compressive load may be applied to the coated or uncoated fibrous preforms 130, thereby compressing the fibrous preforms 130 until stops 306 contact adjacent separator plates 304.

In various embodiments, compressive pressure may be applied to coated or uncoated fibrous preforms 130 during the carbonization. The compressive pressure may be applied by placing a weight 310 over fibrous preforms 130, or by applying a compressive load to the fibrous preforms 130 by other suitable means. The compressive pressure may be applied along the direction of the z-fibers. It will be appreciated by those skilled in the art that the mass of weight 310 and/or the compressive force generated by weight 310 may vary depending on the size of fibrous preforms 130, the pre-carbonization fiber volume of fibrous preforms 130, the desired post-carbonization fiber volume of fibrous preforms 130, and/or the number fibrous preforms 130 being compressed. As used herein, "fiber volume" refers the percentage of the total volume of the fibrous preform that is formed by the fibers of the fibrous preform. For example, a fiber volume of 18% means the fibers of the fibrous preform form 18% of the total volume of fibrous preform. In various embodiments, after carbonization, fibrous preform 130 includes a fiber volume of between 10% and 50%. In various embodiments, after carbonization, fibrous preform 130 includes a fiber volume of between 15% and 25%. In various embodiments, fibrous preforms 130 having a low fiber volume may be desirable for the infiltration methods disclosed herein. In various embodiments, after carbonization, fibrous preform 130 may comprise a fiber volume of less than 25%. For example, in various embodiments, after carbonization, fibrous preform 130 may comprise a fiber volume of 21% or, in various embodiments, fibrous preform 130 may comprise a fiber volume of 18%.

Figure 10:
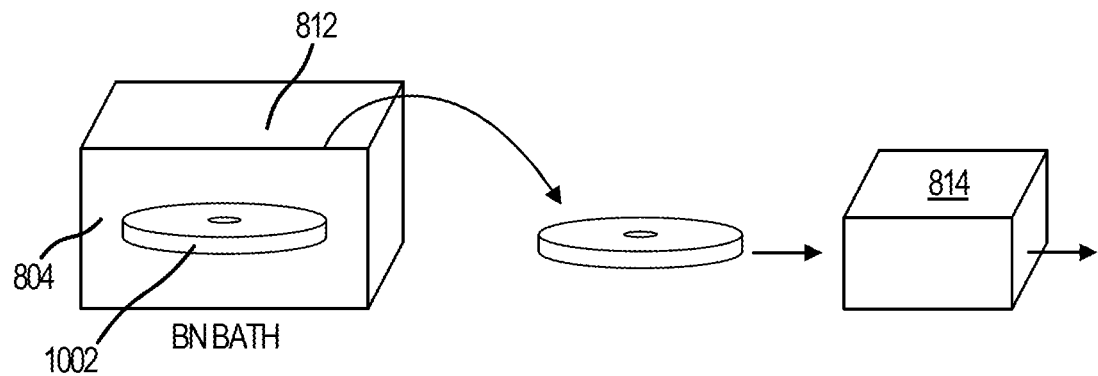
Figure 11:
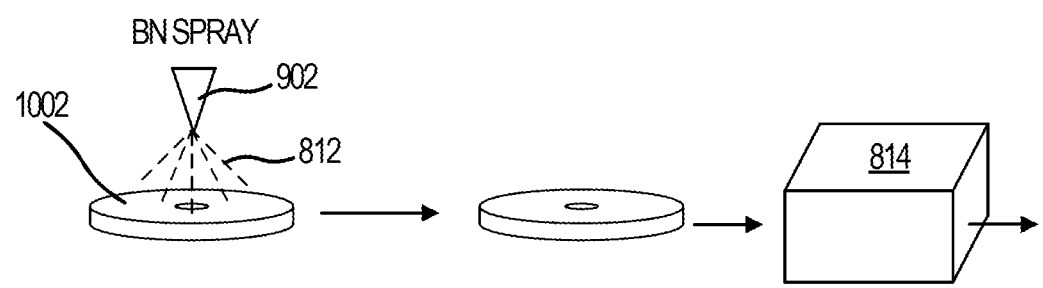

After carbonization, coated or uncoated fibrous preforms 130, may be densified using, for example, chemical vapor infiltration (CVI) with pyrolytic carbon at a predetermined temperature for a predetermined time interval as is known in the art. In various embodiments, prior to densification, if starting fibers were not previously coated with BN precursor which was cured and then crystallized during carbonization, then the uncoated fibrous preform 130 may instead be coated or impregnated with BN precursor via spraying or infiltration as illustrated in FIGS. 10 and 11. In various embodiments, the BN precursor impregnation process includes generation of the BN precursor and immersing the formed fibrous preform 130 into a bath of the BN precursor in an inert atmosphere for a period of time sufficient for the BN precursor to infiltrate the fibrous preform 130. In various embodiments, the BN precursor coating process includes generation of the BN precursor and spraying the BN precursor onto the formed fibrous preform 130 in an inert atmosphere so that the BN precursor coats the fibrous preform 130.

In various embodiments, an amount of the BN precursor infiltrated into the carbon fibers of the fibrous preform 130 or into and/or onto the fibrous preform 130 itself may be between 0.05 percent to 25 percent of a total weight of the fibrous carbon preform 130. In various embodiments, an amount of the BN precursor infiltrated into the carbon fibers of the fibrous preform 130 or into and/or onto the fibrous preform 130 itself may be between 0.1 percent to 15 percent of a total weight of the fibrous preform 130. In various embodiments, an amount of the BN precursor infiltrated into the carbon fibers of the fibrous preform 130 or into and/or onto the fibrous preform 130 itself may be between 5 percent to 10 percent of a total weight of the fibrous preform 130. In various embodiments, infiltration of the BN polymer precursor in this manner may result in a 2 percent to 5 percent of BN particulates or powder in the finished carbon/carbon (C/C) disk after curing and crystallizing the BN polymer precursor into BN and densifying the disk with pyrolytic carbon via CVI. In that regard, the BN particulates are placed into/onto the C/C disk, the C/C disk with the BN particulates is then heated and then densified to achieve typical densities associated with aircraft brakes (~1.8 grams/cubic centimeter).

In various embodiments, after densification is completed with pyrolytic carbon from CVI, a densified C/C disk is produced. In various embodiments, after densification, if a densified C/C disk was not previously coated with BN precursor at any processing step, then the densified C/C disk may instead be coated or impregnated with BN precursor via spraying or infiltration through a variety of embodiments. In various embodiments, the BN precursor impregnation process includes generation of the BN polymer precursor and immersing the densified C/C disk into a bath of the BN precursor in an inert atmosphere for a period of time sufficient for the BN precursor to infiltrate the densified C/C. In various embodiments, the BN polymer precursor coating process includes generation of the BN polymer precursor and spraying the BN polymer precursor onto the densified C/C disk in an inert atmosphere so that the BN polymer precursor coats the densified C/C disk. Due to the thermal capacity and lubricious properties of boron nitride (BN), depending on an amount of BN particulates added to carbon fibers of the fibrous preform 130 or the fibrous preform 130, thermal properties of carbon brakes may be increased by adding larger concentrations and a wear rate of the carbon brakes may be decreased by adding lower concentrations, thereby extending a brake life of the carbon brakes.

Figure 4:
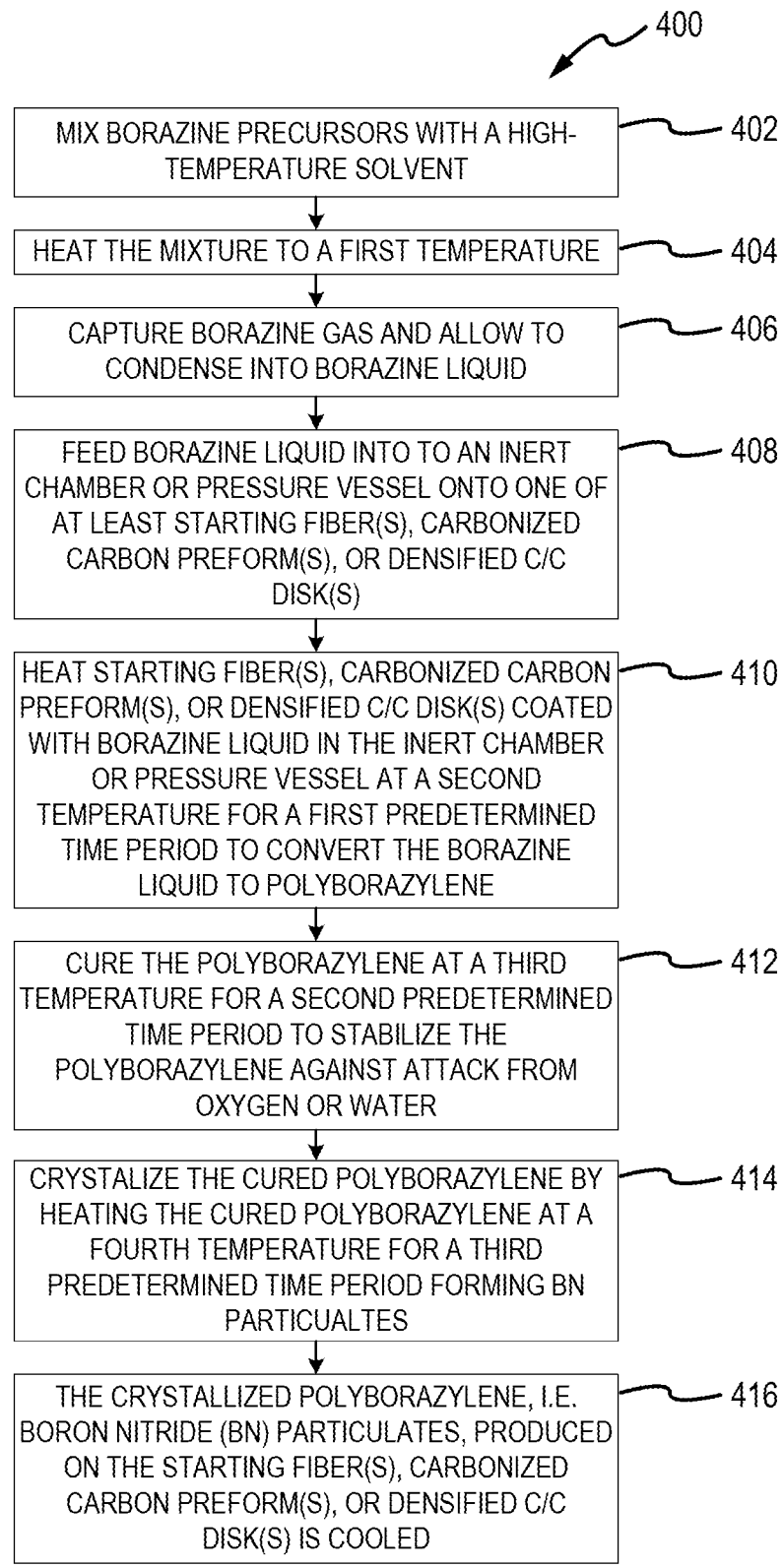
FIG. 4 illustrates a flowchart of a method for generating boron nitride (BN) in order to infiltrate carbon fibers of the fibrous preform or the fibrous preform in accordance with various embodiments.

Referring now to FIG. 4, in accordance with various embodiments, a flowchart of a method 400 for generating boron nitride (BN) in order to infiltrate carbon fibers of the fibrous preform 130 is illustrated. In various embodiments, at block 402, borazine precursors, e.g. ammonium sulfate (($NH_4$)$_2SO_4$) and sodium borohydride ($NaBH_4$), are mixed with a high-temperature solvent, i.e. a solvent with a high boiling point, e.g. tetraethylene glycol dimethyl ether, i.e. tetraglyme. In various embodiments, at block 404 the mixture is heated to a first temperature until fully reacted. In various embodiments, the mixture may be heated to a first temperature of between 135° C. (275° F.) and 150° C. (302° F.) until fully reacted. In various embodiments, the mixture may be heated to a first temperature of between 135° C. (275° F.) and 140° C. (284° F.) until fully reacted. In various embodiments, the mixture may be heated to a first temperature of at least 135° C. (275° F.) until fully reacted.

In various embodiments, the mixing and the heating may be performed in a vacuum. In various embodiments, the mixing and the heating is performed in a vacuum in order that, at block 406, a borazine gas, which is a formed product from the reaction which occurs between the ($NH_4$)$_2SO_4$ and $NaBH_4$ when heating the mixture, is captured via a vacuum trap. In that regard, while the reaction occurs as the mixture is being heated, the borazine gas that is emitted is captured via a vacuum trap as gas is pulled out of the reaction vessel and into the vacuum trap which is surrounded by liquid nitrogen. The borazine gas condenses as a liquid in the trap to a borazine liquid, of which both the borazine gas and liquid are reactive with air and water. Accordingly, in various embodiments, at block 408, under vacuum or inert atmosphere, the condensed borazine liquid is transferred to an inert chamber or pressure vessel. In various embodiments, the vessel may be a pressurized chamber for coating methods or may be a vessel containing a starting fiber(s), carbonized carbon preform(s), or densified C/C disk(s), where the borazine liquid is poured over the starting fiber(s), carbonized carbon preform(s), or densified C/C disk(s). In various embodiments, the liquid borazine collects on the carbonized carbon preform.

In various embodiments, at block 410, the starting fiber(s), carbonized carbon preform(s), or densified C/C disk(s) coated with borazine in the inert chamber or pressure vessel is then heated at a second temperature for a first predetermined time period, which causes the borazine to undergo dehydropolymerization, where the borazine loses two hydrogen (H) atoms and is stabilized as polyborazylene, which is stable in oxygen but still reactive with water. In various embodiments, the starting fiber(s), carbonized carbon preform(s), or densified C/C disk(s) coated with borazine in the inert chamber or pressure vessel is heated at a second temperature of between 40° C. (104° F.) to 60° C. (140° F.). In various embodiments, the starting fiber(s), carbonized carbon preform(s), or densified C/C disk(s) coated with borazine in the inert chamber or pressure vessel is heated at a second temperature of between 45° C. (113° F.) to 55° C. (131° F.). In various embodiments, the starting fiber(s), carbonized carbon preform(s), or densified C/C disk(s) coated with borazine in the inert chamber or pressure vessel is heated at a second temperature of 50° C. (122° F.). In various embodiments, the first predetermined time period is between 150 hours and 210 hours. In various embodiments, the first predetermined time period is between 180 hours and 200 hours. In various embodiments, the first predetermined time period is 192 hours. In various embodiments, heating the starting fiber(s), carbonized carbon preform(s), or densified C/C disk(s) coated with borazine in the inert chamber or pressure vessel for a predetermined time period converts the borazine into polyborazylene, which is a polymerized version of borazine.

In various embodiments, at block 412, the starting fiber(s), carbonized carbon preform(s), or densified C/C disk(s) coated with borazine is then transferred to a furnace where the polyborazylene is cured at a third temperature for a second predetermined time period to stabilize the polyborazylene against attack from oxygen or water. In various embodiments, the polyborazylene is cured a third temperature of between 180° C. (356° F.) to 220° C. (428° F.). In various embodiments, the polyborazylene is cured a third temperature of between 190° C. (374° F.) to 210° C. (410° F.). In various embodiments, the polyborazylene is cured a third temperature of 200° C. (392° F.). In various embodiments, the second predetermined time period is between 2 hours and 3 hours. In various embodiments, the second predetermined time period is between 2 hours and 2.5 hours. In various embodiments, the second predetermined time period is 2 hours.

After curing, in various embodiments, at block 414, the polyborazylene is crystallized. In various embodiments, in order to crystalize the polyborazylene and form boron nitride (BN), the cured polyborazylene is heated to at a fourth temperature for a third predetermined time period. In various embodiments, the cured polyborazylene is heated a third temperature of between 1200° C. (2192° F.) to 2000° C. (3632° F.). In various embodiments, the cured polyborazylene is heated a third temperature of between 1300° C. (2372° F.) to 1900° C. (3452° F.). In various embodiments, the cured polyborazylene is heated a third temperature of between 1400° C. (2552° F.) to 1800° C. (3272° F.). In various embodiments, the third predetermined time period is between 2 hours and 5 hours. In various embodiments, the third predetermined time period is between 2 hours and 4.5 hours. In various embodiments, the third predetermined time period is between 2 hours and 4 hours. After crystallization, at block 416, the crystallized polyborazylene, i.e. boron nitride (BN) particulates, produced on the starting fiber(s), carbonized carbon preform(s), or densified C/C disk(s) is cooled.

Figure 5:
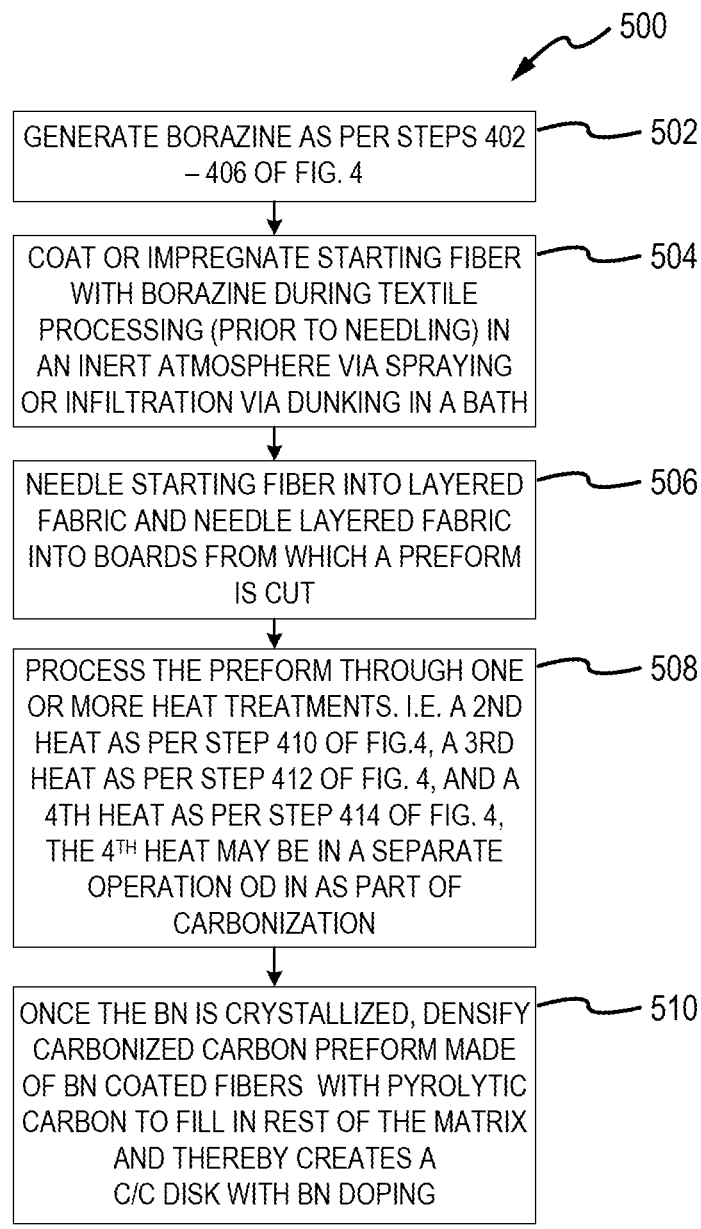
FIG. 5 illustrates a flowchart of a method for coating or impregnating starting carbon fibers to create a carbon/carbon (C/C) disk with boron nitride (BN) doping, in accordance with various embodiments.

Referring now to FIG. 5, in accordance with various embodiments, a flowchart of a method 500 for coating or impregnating starting carbon fibers to create a carbon/carbon (C/C) disk with boron nitride (BN) doping is illustrated. At bock 502, borazine is generated as described in blocks 402 through 406 of FIG. 4. At block 504, the starting fibers are coated or impregnated with the borazine during textile processing (prior to needling) in an inert atmosphere via spraying or infiltration via dunking in a bath. In various embodiments, an amount of borazine used to coat or infiltrate the starting fiber may be between 0.05 percent to 25 percent of a total weight of the starting fiber. At block 506, the starting fiber is needled into layered fabric and the layered fabric is then needled into boards from which a preform is cut. In various embodiments, the needling and cutting in performed in an inert atmosphere. At block 508, the preform made of coated fibers is then stabilized at a $2^{nd}$ heat as per block 410 of FIG. 4, cured at a $3^{rd}$ temperature as per block 412 of FIG. 4, and crystallized at a 4th temperature as per block 414 of FIG. 4. In various embodiments, when coating or impregnating a starting fiber, 4th heat may be performed in either a separate run or in a carbonization operation. At block 510, once the BN is crystallized, the carbonized carbon preform made of BN coated fibers is then densified with pyrolytic carbon to fill in the rest of the matrix and thereby create a C/C disk with BN doping.

Figure 6:
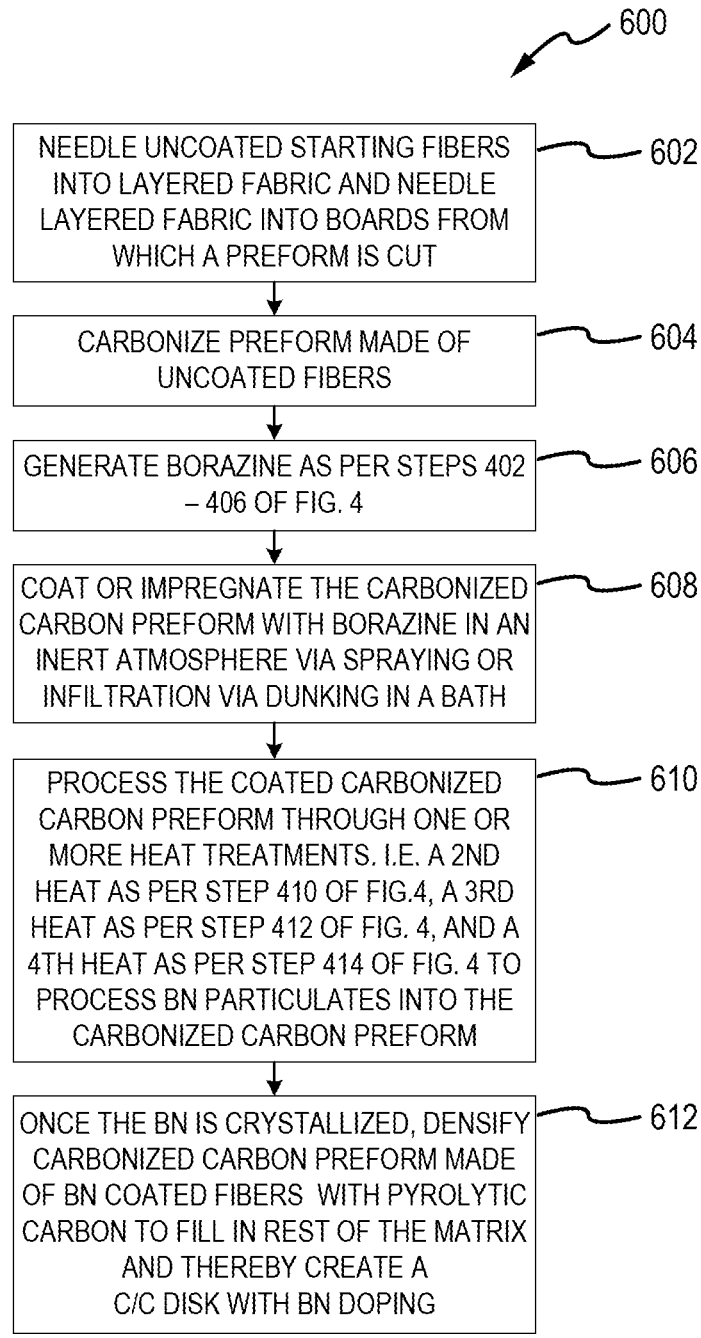
FIG. 6 illustrates a flowchart of a method for coating or impregnating carbonized preforms to create a carbon/carbon (C/C) disk with boron nitride (BN) doping, in accordance with various embodiments.

Referring now to FIG. 6, in accordance with various embodiments, a flowchart of a method 600 for coating or impregnating carbonized preforms to create a carbon/carbon (C/C) disk with boron nitride (BN) doping is illustrated. At block 602, a starting fiber is needled into layered fabric and the layered fabric is then needled into boards from which a preform is cut, the needling preformed without BN doping. At block 604, the preform made of uncoated fibers is then carbonized without BN doping. At block 606, borazine is generated as described in blocks 402 through 406 of FIG. 4. At block 608, the carbonized carbon preform are coated or impregnated with the borazine during textile processing (prior to needling) in an inert atmosphere via spraying or infiltration via dunking in a bath. In various embodiments, an amount of borazine used to coat or infiltrate the starting fiber may be between 0.05 percent to 25 percent of a total weight of the starting fiber. At block 610, the coated carbonized carbon preform is then stabilized at a $2^{nd}$ heat as per block 410 of FIG. 4, cured at a $3^{rd}$ temperature as per block 412 of FIG. 4, and crystallized at a 4th temperature as per block 414 of FIG. 4. At block 612, once the BN is crystallized, the carbonized carbon preform made of BN coated fibers is then densified with pyrolytic carbon to fill in the rest of the matrix and thereby create a C/C disk with BN doping.

Figure 7:
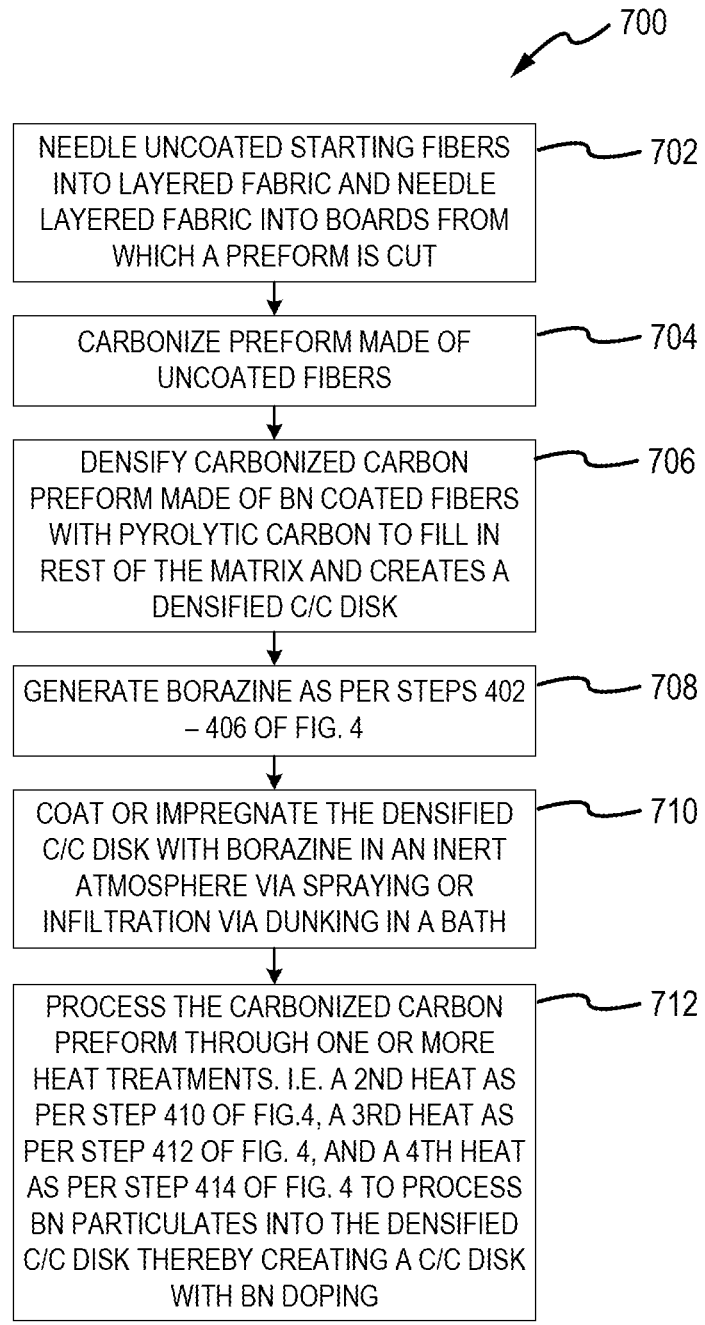
FIG. 7 illustrates a flowchart of a method for coating or impregnating a densified carbon/carbon (C/C) disk with boron nitride (BN) doping, in accordance with various embodiments.

Referring now to FIG. 7, in accordance with various embodiments, a flowchart of a method 700 for coating or impregnating a densified carbon/carbon (C/C) disk with boron nitride (BN) doping is illustrated. At block 702, a starting fiber is needled into layered fabric and the layered fabric is then needled into boards from which a preform is cut, the needling preformed without BN doping. At block 704, the preform made of uncoated fibers is then carbonized without BN doping. At block 706, the carbonized carbon preform is then densified with pyrolytic carbon to fill in the rest of the matrix without BN doping to form a densified C/C disk. At block 708, borazine is generated as described in blocks 402 through 406 of FIG. 4. At block 710, the densified C/C disk is coated or impregnated with the borazine during textile processing (prior to needling) in an inert atmosphere via spraying or infiltration via dunking in a bath. In various embodiments, an amount of borazine used to coat or infiltrate the starting fiber may be between 0.05 percent to 25 percent of a total weight of the starting fiber. At block 712, the coated densified C/C disk is then stabilized at a $2^{nd}$ heat as per block 410 of FIG. 4, cured at a $3^{rd}$ temperature as per block 412 of FIG. 4, and crystallized at a 4th temperature as per block 414 of FIG. 4 thereby create a densified C/C disk with BN doping.

With reference to FIG. 8, a set of starting carbon fibers 802 used to form a fibrous preform may be submerged in BN particulates bath 804. For example, the set of starting carbon fibers 802 may be directed via an arrangement of rollers, such as roller 806, roller 808, and roller 810 for example, into BN particulates bath 804. BN particulates bath 804 may be filled with BN particulates 812. The set of starting carbon fibers 802 may then be needled, carbonized, and/or densified in 814 to set the BN particulates 812 onto the set of starting carbon fibers 802.

With reference to FIG. 9, the set of starting carbon fibers 802 used to form a fibrous preform may be sprayed with BN particulates 812. For example, a nozzle 902 may spray the BN particulates 812 onto the set of starting carbon fibers 802. In various embodiments, in response to the set of starting carbon fibers 802 being coated with the BN particulates 812, the set of starting carbon fibers 802 may then be needled, carbonized, and/or densified in 814 to set the BN particulates 812 onto the set of starting carbon fibers 802.

With reference to FIG. 10, a formed fiber preform 1002 may be submerged in BN particulates bath 804 of BN particulates 812. For example, the formed fiber preform 1002 may be submerged in BN particulates bath 804 of BN particulates 812. The formed fiber preform 1002 may then be carbonized, and/or densified in 814 to set the BN particulates 812 onto the formed fiber preform 1002.

With reference to FIG. 11, the formed fiber preform 1002 may be sprayed with BN particulates 812. For example, nozzle 902 may spray the BN particulates 812 onto the formed fiber preform 1002. In various embodiments, in response to the formed fiber preform 1002 being coated with the BN particulates 812, the formed fiber preform 1002 may then be carbonized, and/or densified in 814 to set the BN particulates 812 onto the formed fiber preform 1002.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming a carbon/carbon (C/C) disk with boron nitride (BN) doping, the method comprising:
   generating borazine using a set of borazine precursors;
   coating or impregnating starting carbon fibers with the borazine in an inert atmosphere, wherein an amount of borazine used to coat or infiltrate the starting carbon fibers is between 0.05 percent to 25 percent of a total weight of the starting carbon fibers;
   needling the starting carbon fibers into layered fabric and then needling the layered fabric into boards from which a preform is cut, the needling and cutting performed in the inert atmosphere;
   stabilizing the borazine in the preform to convert the borazine to polyborazylene, wherein the stabilizing is performed by heating the preform at a first temperature for a first predetermined time period, wherein the first temperature is between 40° C. (104° F.) to 60° C. (140° F.);
   curing the polyborazylene in the preform;
   crystalizing the polyborazylene in the preform to form BN particulates, wherein the crystalizing is performed by heating the preform at a second temperature for a second predetermined time period, causing the polyborazylene to form the BN particulates; and
   densifying the BN particulates in the preform with pyrolytic carbon.

2. The method of claim 1, wherein the coating or impregnating is performed via spraying or dunking in a bath.

3. The method of claim 1, wherein the borazine is formed by the method comprising:
   mixing the set of borazine precursors with a high-temperature solvent thereby forming a mixture;
   heating the mixture to a third temperature;
   capturing off gases emitted by the mixing and heating; and
   condensing the off gases to liquify the borazine.

4. The method of claim 3, wherein the set of borazine precursors comprise ammonium sulfate (($NH_4$)$_2SO_4$) and sodium borohydride ($NaBH_4$) and wherein the high-temperature solvent is tetraethylene glycol dimethyl ether, i.e. tetraglyme.

5. The method of claim 3, wherein the third temperature is between 135° C. (275° F.) and 150° C. (302° F.).

6. The method of claim 1, wherein the first predetermined time period is between 170 hours and 210 hours.

7. The method of claim 1, wherein the curing is performed at a third temperature for a third predetermined time period, wherein the third temperature is between 180° C. (356° F.) to 220° C. (428° F.), and wherein the third predetermined time period is between 2 hours and 3 hours.

8. The method of claim 1, wherein the second temperature is between 1200° C. (2192° F.) to 2000° C. (3632° F.), and wherein the second predetermined time period is between 2 hours and 5 hours.

9. A method for forming a carbon/carbon (C/C) disk with boron nitride (BN) doping, the method comprising:
   generating borazine using a set of borazine precursors;
   coating or impregnating a carbonized carbon preform with the borazine in an inert atmosphere, wherein an amount of borazine used to coat or infiltrate the carbonized carbon preform is between 0.05 percent to 25 percent of a total weight of the carbonized carbon preform;
   stabilizing the borazine in the carbonized carbon preform to convert the borazine to polyborazylene, wherein the stabilizing performed by heating the carbonized carbon preform at a first temperature for a first predetermined time period, wherein the first temperature is between 40° C. (104° F.) to 60° C. (140° F.);
   curing the polyborazylene in the carbonized carbon preform;
   crystalizing the polyborazylene in the carbonized carbon preform to form BN particulates, wherein the crystalizing is performed by heating the preform at a second temperature for a second predetermined time period, causing the polyborazylene to form the BN particulates; and densifying the BN particulates in the carbonized carbon preform with pyrolytic carbon.

10. The method of claim 9, wherein the coating or impregnating is performed via spraying or dunking in a bath.

11. The method of claim 9, wherein the borazine is formed by the method comprising:
mixing the set of borazine precursors with a high-temperature solvent thereby forming a mixture;
heating the mixture to a third temperature;
capturing off gases emitted by the mixing and heating; and
condensing the off gases to liquify the borazine,
wherein the set of borazine precursors comprise ammonium sulfate (($NH_4)_2SO_4$) and sodium borohydride ($NaBH_4$),
wherein the high-temperature solvent is tetraethylene glycol dimethyl ether, i.e. tetraglyme, and
wherein the third temperature is between 135° C. (275° F.) and 150° C. (302° F.).

12. The method of claim 9, wherein the first predetermined time period is between 170 hours and 210 hours.

13. The method of claim 9,
wherein the curing is performed at a third temperature for a third predetermined time period, wherein the third temperature is between 180° C. (356° F.) to 220° C. (428° F.), and wherein the third predetermined time period is between 2 hours and 3 hours, and
wherein the second temperature is between 1200° C. (2192° F.) to 2000° C. (3632° F.), and wherein the second predetermined time period is between 2 hours and 5 hours.

14. The method of claim 9, wherein the carbonized carbon preform is formed by:
needling uncoated carbon fiber into layered fabric and then needling the layered fabric into boards from which a preform is cut, the needling and cutting performed without BN doping; and
carbonizing the preform made of uncoated carbon fibers to form a carbonized carbon preform.

15. A method for forming a carbon/carbon (C/C) disk with boron nitride (BN) doping, the method comprising:
needling uncoated starting carbon fiber into layered fabric and then needling the layered fabric into boards from which a preform is cut, the needling and cutting performed without BN doping;
carbonizing the preform made of uncoated carbon fibers to form a carbonized carbon preform;
densifying the carbonized carbon preform with pyrolytic carbon thereby create a densified C/C disk;
generating borazine using a set of borazine precursors;
coating or impregnating the densified C/C disk with the borazine in an inert atmosphere, wherein an amount of borazine used to coat or infiltrate the densified C/C disk is between 0.05 percent to 25 percent of a total weight of the densified C/C disk;
stabilizing the borazine in the densified C/C disk to convert the borazine to polyborazylene, wherein the stabilizing performed by heating the preform at a first temperature for a first predetermined time period, wherein the first temperature is between 40° C. (104° F.) to 60° C. (140° F.);
curing the polyborazylene in the densified C/C disk; and
crystalizing the polyborazylene in the densified C/C disk to form BN particulates, wherein the crystalizing is performed by heating the preform at a second temperature for a second predetermined time period, causing the polyborazylene to form the BN particulates.

16. The method of claim 15, wherein the coating or impregnating is performed via spraying or dunking in a bath.

17. The method of claim 15, wherein the borazine is formed by the method comprising:
mixing the set of borazine precursors with a high-temperature solvent thereby forming a mixture;
heating the mixture to a third temperature;
capturing off gases emitted by the mixing and heating; and
condensing the off gases to liquify the borazine,
wherein the set of borazine precursors comprise ammonium sulfate (($NH_4)_2SO_4$) and sodium borohydride ($NaBH_4$),
wherein the high-temperature solvent is tetraethylene glycol dimethyl ether, i.e. tetraglyme, and
wherein the third temperature is between 135° C. (275° F.) and 150° C. (302° F.).

18. The method of claim 15, wherein the first predetermined time period is between 170 hours and 210 hours.

19. The method of claim 15, wherein the curing is performed at a third temperature for a third predetermined time period, wherein the third temperature is between 180° C. (356° F.) to 220° C. (428° F.), and wherein the third predetermined time period is between 2 hours and 3 hours.

20. The method of claim 15, wherein the second temperature is between 1200° C. (2192° F.) to 2000° C. (3632° F.), wherein the second predetermined time period is between 2 hours and 5 hours.

* * * * *